US012598505B2

(12) United States Patent
Sandberg et al.

(10) Patent No.: US 12,598,505 B2
(45) Date of Patent: Apr. 7, 2026

(54) INTERFERENCE DETECTION MECHANISMS FOR MICROWAVE RADIO LINK TRANSCEIVERS

(71) Applicant: Telefonaktiebolaget LM Ericsson (publ), Stockholm (SE)

(72) Inventors: Jan Sandberg, Frillesås (SE); Agne Larsson, Alingsås (SE); Lars-Erik Lindberg, Härryda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 300 days.

(21) Appl. No.: 18/279,887

(22) PCT Filed: Mar. 5, 2021

(86) PCT No.: PCT/EP2021/055672
§ 371 (c)(1),
(2) Date: Sep. 1, 2023

(87) PCT Pub. No.: WO2022/184278
PCT Pub. Date: Sep. 9, 2022

(65) Prior Publication Data
US 2024/0162926 A1 May 16, 2024

(51) Int. Cl.
*H04W 28/02* (2009.01)
*H04B 1/10* (2006.01)

(52) U.S. Cl.
CPC ...... *H04W 28/0236* (2013.01); *H04B 1/1027* (2013.01); *H04W 28/0263* (2013.01)

(58) Field of Classification Search
CPC .......... H04W 28/0236; H04W 28/0263; H04B 1/1027
See application file for complete search history.

(56) References Cited

U.S. PATENT DOCUMENTS 11,101,832 B1 * 8/2021 Li ........................... H04B 1/123
2003/0219069 A1 11/2003 Chen et al.
(Continued)

FOREIGN PATENT DOCUMENTS

WO 2013/070751 A1 5/2013
WO 2014/023351 A1 2/2014

OTHER PUBLICATIONS

International Search Report and Written Opinion issued in International Application No. PCT/EP2021/055672 dated Jan. 28, 2022 (15 pages).
(Continued)

*Primary Examiner* — Janice N Tieu
(74) *Attorney, Agent, or Firm* — Rothwell, Figg, Ernst & Manbeck, P.C.

(57) ABSTRACT

A demodulator (310) for a microwave radio link transceiver (110, 300), comprising an input port (311, 312) arranged to receive a radio signal (Din, Sin), a slicer module (313) arranged to detect an information signal (Sdet, 201) comprised in the received radio signal, an interference detection module (314) arranged to determine a difference signal as a difference between the received radio signal (Din, Sin), and the detected information signal (Sdet), wherein the interference detection module (314) is arranged to detect one or more interference signals (202, 203, 204) by identifying signal content comprised in the difference signal, the signal content being associated with a signal power (230) above a pre-determined threshold level (260, 261), wherein the interference detection module (314) is further arranged to associate at least one of the detected interference signals (202, 203, 204) with one or more respective identification features, and wherein the demodulator (310) comprises an output port (315) arranged to output data (400, 450) indicative of the one or more identification features.

11 Claims, 4 Drawing Sheets

(56) References Cited

U.S. PATENT DOCUMENTS

| | | |
|---|---|---|
| 2008/0181291 A1 | 7/2008 | Zhou et al. |
| 2011/0149764 A1 | 6/2011 | Wietfeldt et al. |
| 2015/0236931 A1 | 8/2015 | Merlin et al. |
| 2015/0245218 A1 | 8/2015 | Hassan et al. |
| 2017/0207803 A1* | 7/2017 | Garrett ................... H04B 1/109 |
| 2019/0342057 A1* | 11/2019 | Rico Alvarino ...... H04W 72/52 |
| 2022/0214422 A1* | 7/2022 | Silander ................... G01S 7/36 |

OTHER PUBLICATIONS

NEC Group, "Framework to define additional carrier type: Carrier segments", R1-113227, 3GPP TSG RAN WG1, Meeting #66bis, Zhuhai, China, Oct. 10-14, 2011, XP050538345 (7 pages).

* cited by examiner

500

Level (dBc)

530

520

510

Time (ms)

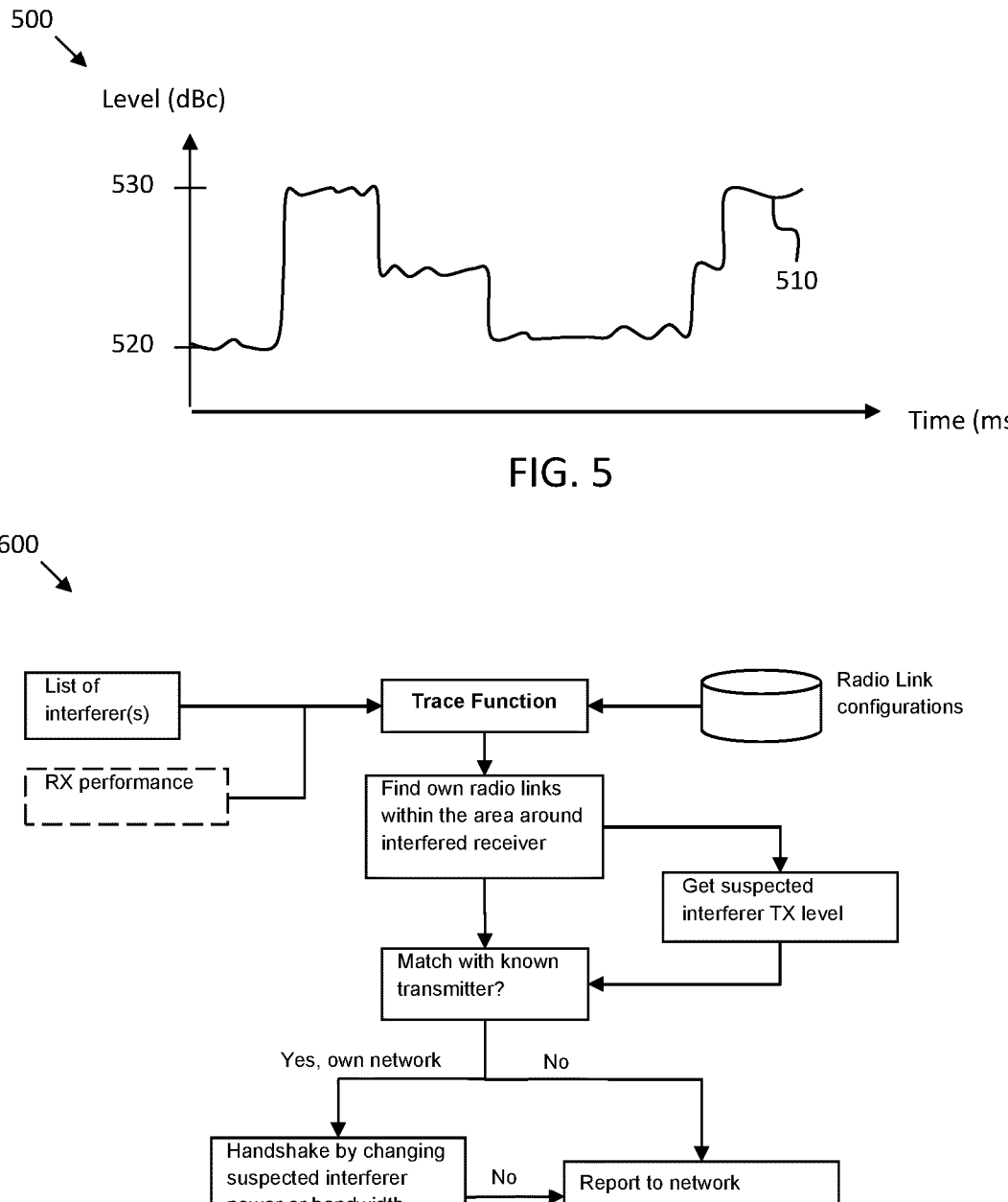

List of
interferer(s)

RX performance

Trace Function

Radio Link
configurations

Find own radio links
within the area around
interfered receiver

Get suspected
interferer TX level

Match with known
transmitter?

Yes, own network          No

Handshake by changing
suspected interferer
power or bandwidth.
Source validated?

No

Report to network
operator:
Interferer {f, BW, P}

Yes

Report validated
interferer with node ID
to network operator.

FIG. 6

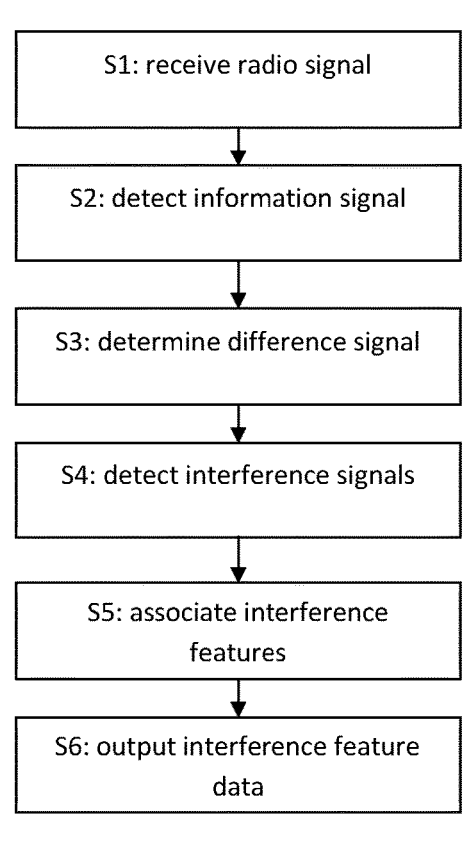
FIG. 7
S1: receive radio signal
S2: detect information signal
S3: determine difference signal
S4: detect interference signals
S5: associate interference features
S6: output interference feature data
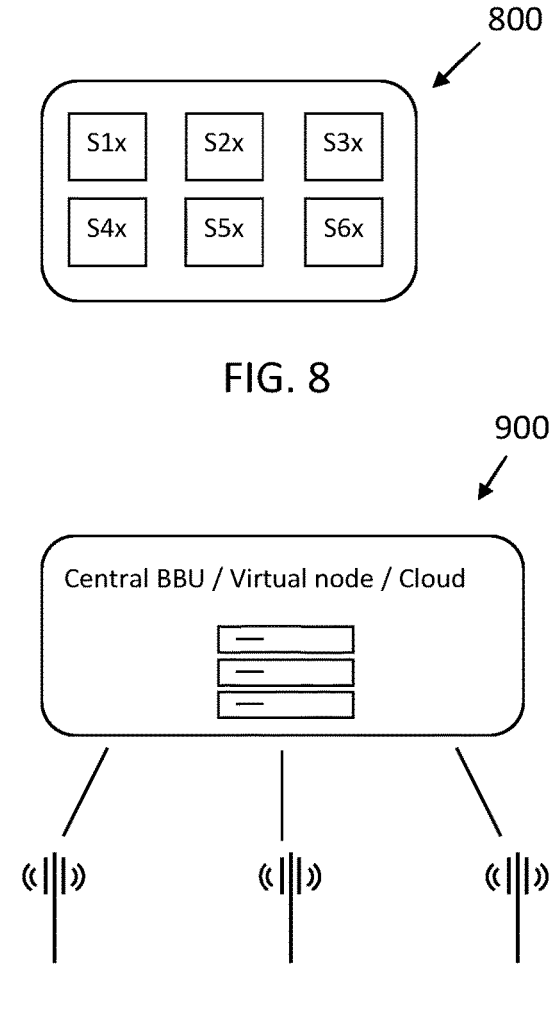
800
| S1x | S2x | S3x |
| S4x | S5x | S6x |
FIG. 8
900
Central BBU / Virtual node / Cloud
FIG. 9
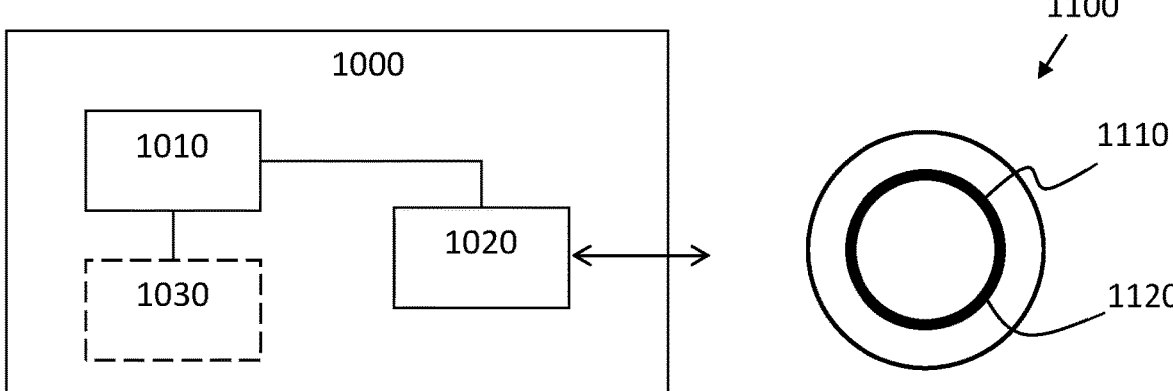
1000
1010
1030
1020
FIG. 10
1100
1110
1120
FIG. 11

INTERFERENCE DETECTION MECHANISMS FOR MICROWAVE RADIO LINK TRANSCEIVERS

CROSS REFERENCE TO RELATED APPLICATIONS

This application is a 35 U.S.C. § 371 National Stage of International Patent Application No. PCT/EP2021/055672, filed 2021 Mar. 5.

TECHNICAL FIELD

The present disclosure relates to microwave radio link receivers and transceivers, and also to communication systems comprising microwave radio links. There are furthermore disclosed network management tools for managing one or more microwave radio link networks, as well as network nodes, computer programs, and computer program products.

BACKGROUND

A microwave radio link is a highly directive point-to-point radio link used, e.g., for backhauling traffic from a cellular access radio base station to a core network, or for fibre replacement in high speed data traffic applications.

The capacity of such a microwave radio link depends, among other things, on the signal to interference and noise ratio (SINR) experienced by the microwave radio link receiver. This SINR deteriorates if a microwave radio link receiver is subject to radio interference from one or more neighboring radio transmitters. Thus, it is desired to minimize interference to the radio link.

Normally, microwave radio links are carefully deployed in relation to each other such that only very little interference occurs between microwave radio link transceivers located in the same local area. However, mistakes in the planning frequently occur, resulting in interference between microwave radio link transceivers. Also, as microwave radio link receiver sensitivity increases, and the propagation environment changes overtime, non-negligible interference may still occur despite the careful frequency planning.

EP2883321A1 discusses the harmful effects of interference in microwave radio links and proposes some techniques for mitigating the interference. However, further improvement in interference mitigation techniques for microwave radio links is desired.

SUMMARY

It is an object of the present disclosure to provide demodulators, network nodes, tools, methods, and computer programs which mitigate interference in microwave radio link networks.

This object is at least in part obtained by a demodulator for a microwave radio link transceiver. The demodulator comprises an input port arranged to receive a radio signal and a slicer module arranged to detect an information signal comprised in the received radio signal. The demodulator also comprises an interference detection module arranged to determine a difference signal as a difference between the received radio signal and the detected information signal, wherein the interference detection module is arranged to detect one or more interference signals by identifying signal content comprised in the difference signal, the signal content being associated with a signal power above a pre-determined threshold level. The interference detection module is further arranged to associate at least one of the detected interference signals with one or more respective identification features. The demodulator also comprises an output port arranged to output data indicative of the one or more identification features.

Thus, there is provided a demodulator for a microwave radio link transceiver which is able to identify one or more interference signals comprised in the received radio signal. Such interference signals may potentially degrade the performance of the microwave radio link. However, once interference has been detected, interference mitigating measures can be taken to improve the SINR of the microwave radio link. Advantageously, the interference detection ability of the demodulator allows an operator or a service technician to distinguish between performance issues related to malfunctioning hardware and software from performance issues relates to external interference. This simplifies radio link network operations and maintenance.

According to aspects, the received radio signal is associated with an intermediate frequency (IF) bandwidth in excess of a frequency band of the information signal. This allows the interference detector to detect interference outside of the frequency band of the information signal, i.e., out-of-band interference.

According to aspects, the received radio signal comprises a digital signal, and the difference signal is determined as a difference in complex amplitude between the received radio signal and the information signal. This way of generating the difference signal allows for detection of in-band interference, which is useful in order to determine a cause of reduced radio link performance.

The difference signal can also be determined as a signal content in the received radio signal at frequencies different from the frequency band of the information signal. This basically amounts to a filtering operation which can be implemented with low complexity. Nevertheless, a robust detection of out-of-band interference is achieved, which is an advantage.

According to aspects, the one or more identification features comprises any of: a power level of the detected interference signal, a frequency bandwidth of the detected interference signal, a carrier and/or centre frequency of the detected interference signal and a polarization distribution of the detected interference signal.

For instance, this allows a network operator to search for a radio link within the operator's network having a carrier frequency and/or bandwidth matching that of the detected interference signal. If a suspected radio link is found it can be validated if it is the source of the interference by executing a change in transmit power at the suspected interfering transmitter. If the interfering signal level changes accordingly, then the source of the interfering signal has been identified. Alternatively or in combination, the center frequency or bandwidth can be changed within a licensed channel to verify that the interfering signal changes accordingly.

According to aspects, the one or more identification features are indicative of a temporal behaviour of the detected interference signal. Some interference signals vary characteristically over time, either by coincidence or because they have been deliberatively modulated, e.g., in order to identify a particular source of interference. By using temporal behaviour as an identification feature, a more robust interference identification mechanism can be achieved.

According to aspects, the data indicative of the one or more identification features comprises a list of a pre-determined number of detected interference signals. This list can be used by an operator as a diagnostic tool to verify that all is in order. If the list shows potentially problematic interference signals, then interference mitigating techniques may be used to improve the radio link performance. The detected interference signals on the list can be arranged according to a severity criterion. This highlights the worst interference signals and therefore simplifies analysis and fault classification. The pre-determined number can be configurable by a user or set according to some other criteria, such as the number of identified interferers.

The above object is also obtained by a network node arranged to identify one or more interfering microwave radio link transceivers out of a plurality of microwave radio link transceivers. The network node is arranged to obtain data indicative of one or more identification features associated with at least one interference signal detected at an interfered microwave radio link receiver. The network node is arranged to obtain transmission characteristics of the transceivers in the plurality of microwave radio link transceivers, and to identify the one or more interfering microwave radio link transceivers based on the one or more identification features and on the respective transmission characteristics.

Consequently, this network node provides a valuable interference analysis function or tool which a network operator can use with advantage to both analyze the interference situation in a given microwave radio link network, as well as to perform interference mitigating actions to improve the overall performance of the radio links in the network. This may improve the overall throughput and spectral efficiency of the microwave radio links in the operators' network.

According to aspects, the transmission characteristics comprise any of geographical transmitter location, geographical transmission direction, transmission output power, transmission bandwidth, and/or transmit antenna pattern. Given one or more detected interference components at some receiver, this type of information about transmission characteristics can be used to match against the identified interferences in order to determine a potential source of the interference efficiently. Thus, advantageously, an operator can reliably identify a source of interference and initiate appropriate counter-measures to improve the interference situation.

According to aspects, the network node is arranged to verify an identity of a microwave radio link transceiver associated with an interference signal by triggering a change in the transmission characteristics for one or more microwave radio link transceivers in the plurality of microwave radio link transceivers and monitoring the data indicative of one or more identification features for a corresponding change in identification features. This way a hypothesis regarding a potential interfering transmitter can be verified with high reliability and accuracy, which is an advantage. Also, if there are two or more potentially interfering transmitters, the correct one can be distinguished in this manner. The change is optionally associated with a detectable pre-determined pattern. This pre-determined pattern can be stored at different nodes in the network and used to simplify the identification process.

According to aspects, the network node is arranged to trigger transmission of an interference notification message to a network entity, where the interference notification message comprises information associated with an identified interfering microwave radio link transceiver. Thus, the network entity becomes aware of the interference issue, and can take appropriate action to improve the interference situation in the network.

The network node is optionally arranged to trigger an interference mitigating change in the transmission characteristics at the identified interfering microwave radio link transceiver, wherein the change comprises any of a decrease in output power, a decrease in transmission frequency bandwidth, a change in carrier frequency, and/or activation of an automatic transmit power control, ATPC, procedure. Thus, the interference conditions in the network can be improved by re-configuration of the interfering transmitter, which is an advantage since it is likely to lead to improved radio link performance. Transmitter parameterization in the network can be optimized in this manner in order to improve overall network throughput and spectral efficiency.

According to aspects, the network node is arranged to trigger an interference mitigating change in operating characteristics at the interfered microwave radio link receiver, wherein the change comprises any of an increase in far-end output power, a decrease in operating frequency bandwidth, a change in carrier frequency, a change in modulation and coding, and/or activation of an automatic transmit power control, ATPC, procedure. This way the interference situation can be improved without re-configuration of the interfering transmitter. This option may be used with advantage in case no re-configuration of the interfering transmitter is possible.

The network node discussed herein may be comprised in a microwave radio link transceiver and/or in a network node arranged to perform a network operations and maintenance (OAM) function in a network of the plurality of microwave radio link transceivers.

There is also disclosed herein methods, control units, circuits, and computer program products associated with the above-mentioned advantages.

BRIEF DESCRIPTION OF THE DRAWINGS

The present disclosure will now be described in more detail with reference to the appended drawings, where:

FIG. 5 schematically illustrates a temporal behavior of an interference signal;

FIG. 6 is a flow chart illustrating an example method;

FIG. 7 is a flow chart illustrating another example method;

FIGS. 8-9 schematically illustrate example network nodes.

FIG. 10 schematically illustrates processing circuitry; and

FIG. 11 shows a computer program product;

DETAILED DESCRIPTION

Figure 1:
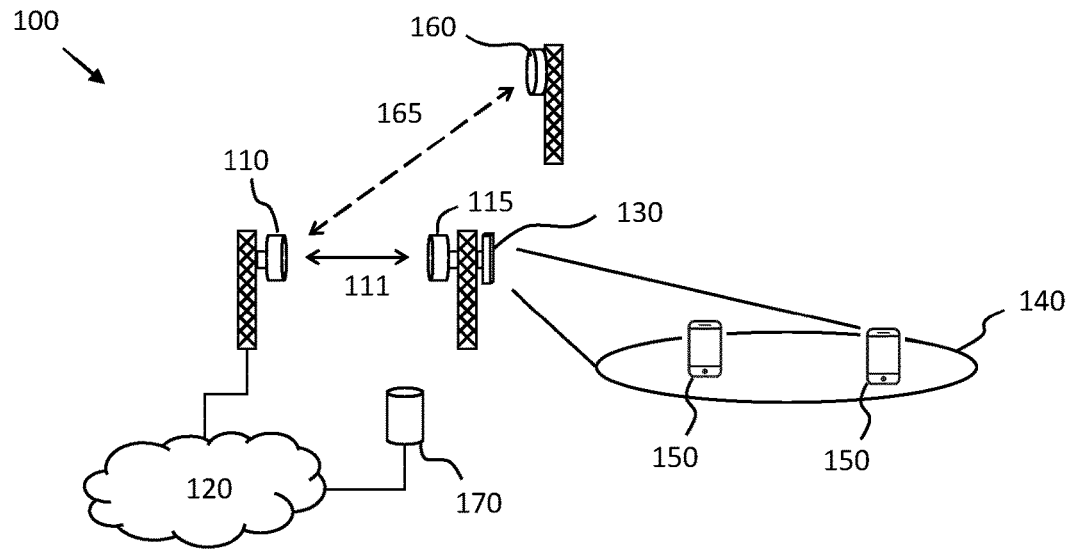
FIG. 1 shows an example communication network.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 illustrates an example communication system 100 comprising one or more radio base stations 130 configured to serve a number of wireless devices 150 comprised in a cellular coverage area 140. The communication system 100 may be a fourth generation (4G), fifth generation (5G) or even a sixth generation (6G) network defined by the third generation partnership program (3GPP), or some other type of communication network. It is appreciated that the techniques disclosed herein are not limited to any particular type of communication system but can be applied in most wireless systems comprising microwave radio links.

A microwave radio link 111 between microwave radio link transceivers 110, 115 is used to backhaul data traffic between the wireless devices 150 and a core network 120. As mentioned above, a microwave radio link transceiver is a radio transceiver operating at high carrier frequency, e.g., above 6 GHz or higher, and arranged with a highly directive antenna to provide a stable, high throughput, data connection between two fixed points. A microwave radio link is often referred to a point-to-point microwave radio link for these reasons.

The throughput and robustness of the wireless connection 111 is at least in part determined by the signal to interference and noise ratio (SINR) experienced at the receiver 110. This SINR deteriorates if the receiver is subject to radio interference 165 from an external source 160.

Normally, the deployment of fixed point-to-point radio links is planned such that neighboring, and therefore potentially interfering, radio links are assigned different frequency bands of operation. However, as receivers become more sensitive, co-channel interference may still become a throughput-limiting factor. Also, the radio propagation channel between transceivers is not always in perfect agreement with the radio propagation channel models used during the planning of the microwave radio link network, which may result in unforeseen interference.

Figure 2:
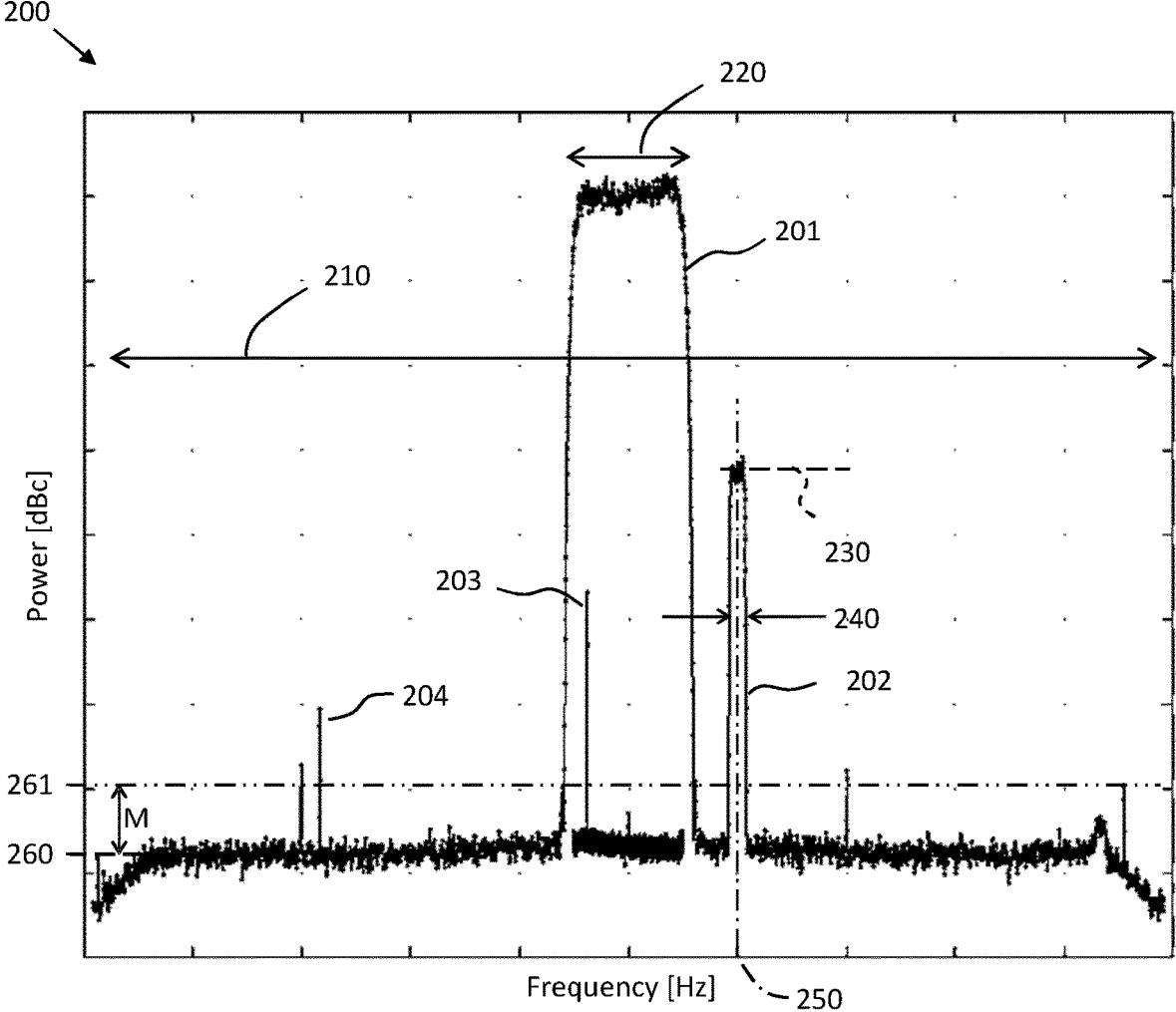
FIG. 2 is a graph showing a received radio signal level vs frequency.

FIG. 2 shows an example graph 200 of an example received radio signal, such as the signal 111 illustrated in FIG. 1, where received signal power in dBc is plotted vs frequency in Hz. The illustrated received signal is associated with an intermediate frequency (IF) bandwidth 210. This IF bandwidth may be determined by the capabilities of an analog to digital converter (ADC) and/or by a configured analog filtering bandwidth in a front-end portion of a microwave radio link receiver. The received radio signal comprises an information signal 201. This component of the received radio signal is the part which carries the useful information of the radio link, e.g., the actual backhaul data traversing the link 111 in FIG. 1. Microwave radio links are normally designed to carry single carrier quadrature amplitude modulated (QAM) information signals, but other options certainly exist. Such other options comprise, e.g., orthogonal frequency division multiplexed (OFDM) information signals, as well as code-division multiple access (CDMA) type signals. The information signal is comprised in an information signal frequency band 220.

A plurality of interference signals 202, 203, 204 are also present. These interfering signals may be undesired since they potentially degrade the SINR seen at the receiver of the information signal 201. Some of the interfering signals 202, 204 are out-of-band interference signals, meaning that they comprise signal energy which is mainly located outside of the information signal frequency band 220. However, there is also in-band interference 203 which contributes directly to a reduction in SINR. Generally, an interference signal is associated with a signal power 230, a frequency bandwidth 240, and a carrier frequency 250 which may also be referred to as a center frequency. These measures are generally known and will therefore not be discussed in more detail herein.

It is noted that features of an interfering signal such as center frequency, bandwidth, and power are identification features which can be used to identify the source of the interference. For instance, suppose that the radio link receiver 110 in FIG. 1 is subject to strong in-band interference at a first center frequency. If an operator is able to determine this first center frequency, then the operator can compare this interfering signal center frequency to the center frequencies of neighboring transmitters, and thus hopefully be able to identify the culprit. Interference mitigating measures can then be taken to reduce the interference in the microwave radio link network, e.g., by changing the frequency planning in the network, and/or by adjusting output powers in the network or adjusting the operating parameters of the interference radio link receiver.

A received radio signal like that plotted in FIG. 2 is associated with a noise floor, which among other things comprises thermal noise generated at the receiver. This type of noise floor can be used as a pre-determined threshold level 260. The noise floor level can be determined, e.g., by averaging away transient effects, and removing strong signal components from the determination. Any signal content within the IF frequency band 210 having a power above the threshold level is likely either an information signal or due to an interfering transmitter. Thus, interference signals can be identified by comparing signal content across the IF bandwidth with the threshold level. Of course, a margin M can be added to the noise floor level, such that the threshold level 261 is higher than the receiver noise floor by the margin M. Such a threshold level 261 is illustrated by the dash double-dotted line in FIG. 2.

Figure 3:
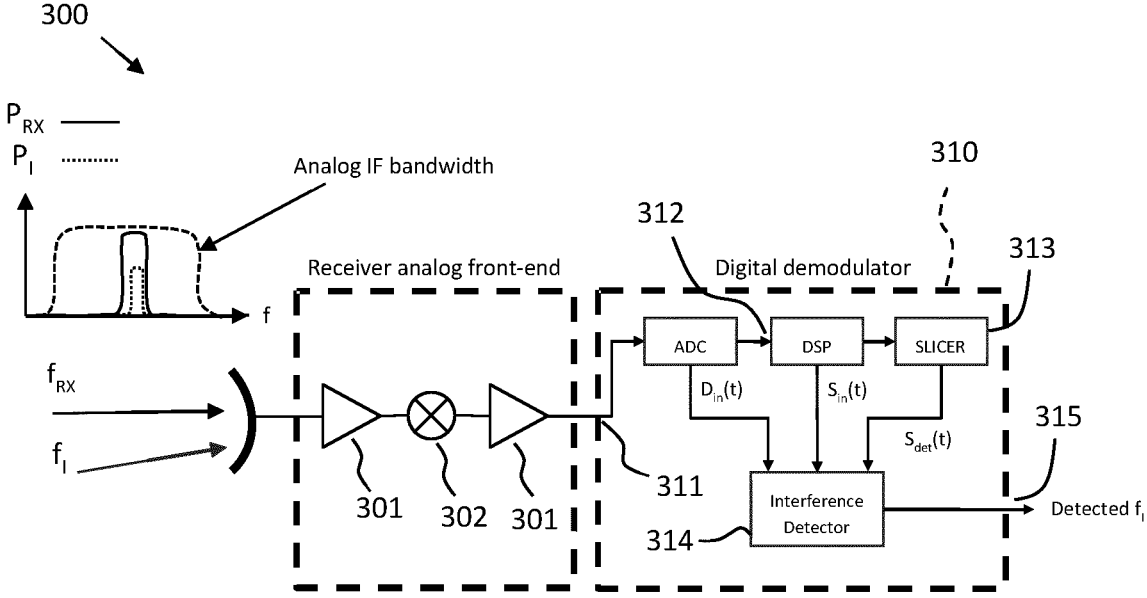
FIG. 3 schematically illustrates a microwave radio link receiver.

FIG. 3 shows an example microwave radio link receiver 300 according to the teachings herein. This receiver 300 may, e.g., form part of a microwave radio link transceiver 110, such as that illustrated in FIG. 1. The receiver 300 comprises an analog front-end with amplifiers 301 and mixers 302. Two signals are received by the analog front-end, an information signal $f_{RX}$ such as the signal 201 discussed in connection to FIG. 2 above, and an unwanted interference signal $f_I$, such as, e.g., any of the signals 202, 203 and/or 204. The analog front-end is associated with an analog IF bandwidth which is wider than the bandwidth of the information signal. An ADC is used to convert the received radio signal into digital domain, which digital signal is then arranged to be processed by a digital signal processing unit (DSP) before being fed to a slicer. The slicer module 313 is arranged to detect an information signal Sdet, i.e., the data carrying signal 201 which was exemplified and discussed in connection to FIG. 2 above. The slicer performs data detection, i.e., recovers data carried by the information signal. In case the information signal is a QAM-modulated signal, the slicer is basically a series of threshold comparisons to detect a sequency of QAM-modulated information symbols. An OFDM modulated signal requires a bank of threshold devices arranged to detect information symbols on a plurality of subcarriers, in a known manner. Other modulation formats may require other types of slicer modules. Principles and mechanisms of data detection by a slicer module are generally known and will therefore not be discussed in more detail herein.

The ADC, the DSP, and the slicer forms part of a digital demodulator 310. This demodulator comprises an input port 311, 312 arranged to receive the radio signal Din, Sin. Note that the "radio signal" is to be interpreted broadly in this context. It may be construed as the analog input samples to the ADC, the digital output samples Din from the ADC, and/or an intermediate output Sin from the DSP, such as a down-sampled and filtered version of the output samples from the ADC. All of these radio signals are generally functions of time t, but may also comprise separate functions over frequency, as in an OFDM modulated system comprising a plurality of subcarriers. According to some other aspects the received radio signal Din is associated with an IF bandwidth 210 in excess of a frequency bandwidth 220 of the information signal Sdet. According to some other aspects the received radio signal Sin comprises a digital signal associated with a bandwidth smaller than the IF bandwidth 210 of the analog radio front end. The signal Sin may be sampled at twice the information symbol rate, or at the information symbol rate of the information signal, or at some other rate not necessarily an even multiple of the symbol rate.

An interference detection module 314 is arranged to determine a difference signal as a difference between the received radio signal Din, Sin, and the detected information signal Sdet. This operation basically amounts to removing the information signal from the received signal, essentially leaving the interference signal or signals and receiver noise as remainder. The difference operation may be implemented as a difference in complex amplitude, or as a frequency difference operation, i.e., a filtering to remove the frequency band 220 of the information signal from the received radio signal IF bandwidth 210. It is appreciated that the difference operation may comprise a reconstruction of the information signal, e.g., by pulse shaping or the like. It is also appreciated that the difference operation may comprise a phase and/or delay adjustment to account for a phase difference and/or a difference in delay, respectively, between the received radio signal and the information signal. Conceptually, the interference detection module receives a signal similar to that plotted in FIG. 2 over the IF bandwidth, and also a representation of the information signal, i.e., only the part 201. A difference operation between these two corresponds to removing the part 201 from the signal content, leaving just the interference 202, 203, 204.

The interference detection module 314 is arranged to detect the one or more interference signals 202, 203, 204 by identifying signal content comprised in the difference signal. With reference again to FIG. 2, suppose that a threshold level 260 has been determined as coinciding with the noise floor of the receiver. Any signal having a power above this threshold level is then defined as an interference signal. Of course, other threshold levels can be selected. For instance, the threshold level 261 which is determined by adding a configurable margin value M to the noise floor level can also be used.

The interference detection module 314 is furthermore arranged to associate at least one of the detected interference signals 202, 203, 204 with one or more respective identification features. Some example identification features will be discussed below. In general, an identification feature of a detected interference signal is some form of characterizing feature that can be used to distinguish the interference signal from other interference signals. The demodulator 310 comprises an output port 315 arranged to output data 400, 450 indicative of the one or more identification features. This output port may be the same output port which is used to output the detected data carried by the information signal, or a separate output port.

Figure 4A:
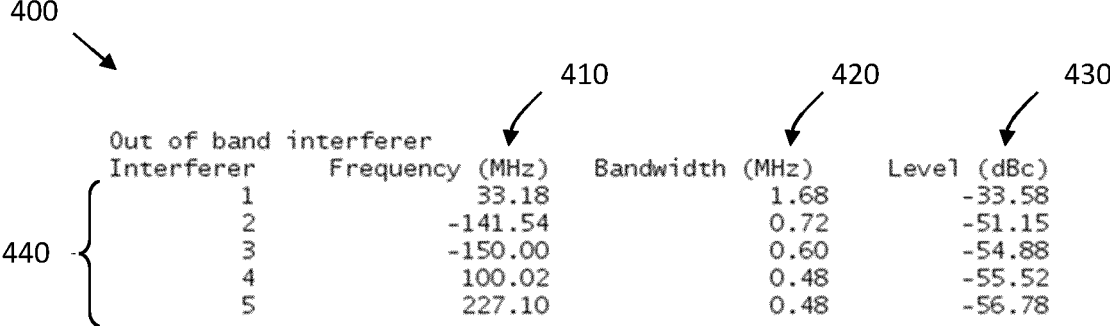
FIGS. 4A-B show reports of detected interference signals.
Figure 4B:
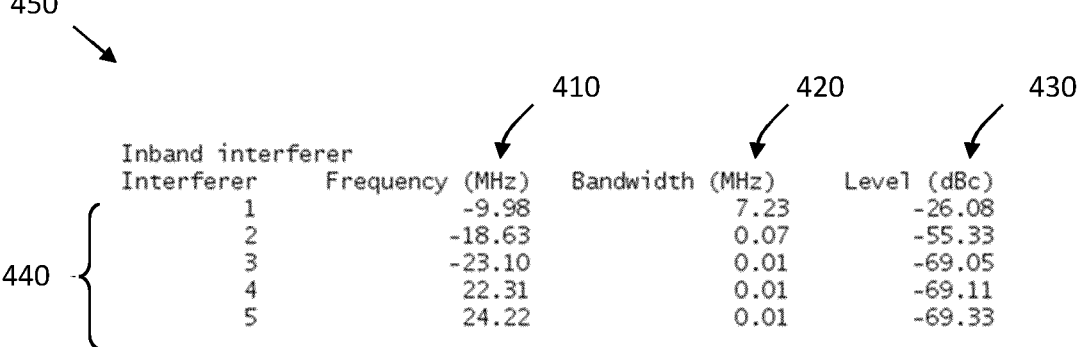

Thus, the demodulator 310 is arranged to receive a radio signal comprising an information signal, and to detect information carried by the information signal by the slicer 313. In addition, the demodulator also outputs some form of data indicative of the interference, which is present in the received radio signal, where the interference can be either in-band or out-of-band, or both. The data indicative of the interference may take many different forms and is to be construed broadly in this context. For instance, this data may simply comprise a flag indicative of a detected interference component in the received radio signal. More advanced examples of the interference data which can be output from the demodulator 310 is shown in FIGS. 4A and 4B. With reference also to FIGS. 4A and 4B, identification features of interest which can be output from the demodulator 310 may comprise any of a power level 230, 430 of the detected interference signals, a frequency bandwidth 240, 420 of the detected interference signals, a carrier frequency, or centre frequency, 250, 410 of the detected interference signals, and/or a polarization distribution of the detected interference signal, i.e., an average ratio of signal power in a first polarization, such as a horizontal polarization, compared to a polarization orthogonal to the first polarization.

The data 400, 450 indicative of the one or more identification features optionally comprises a list 440 of a predetermined number of detected interference signals as shown in FIGS. 4A and 4B. These detected interference signals may be sorted or otherwise arranged according to a severity criterion. This severity criterion may, e.g., be the power level of the interference, and/or if the interference is in-band or not. Separate reports may also be issued for in-band and for out-of-band interference signals.

An interference signal may be associated with a characteristic temporal behavior, as illustrated in FIG. 5, which shows a graph 500 of interference signal level 510 (in dBc) as function of time (in milli-seconds). This interference signal level varies between a minimum level 520 and a maximum level 530. The one or more identification features is optionally also indicative of a temporal behaviour of the detected interference signal, which may simplify identifying an interfering transmitter in case transmitters in the neighborhood of the interfered link has different duty cycles or other forms of differences in temporal behavior. A temporal behaviour identification feature may comprise any of, a duty cycle of the interference signal, a periodicity of the interference signal, a maximum and/or a minimum level of the interference signal, and a sequence of observed interference power levels.

The output data from the demodulator 310 indicative of the one or more identification features can, as mentioned above, be used to identify interfering transmitters, in order to take interference mitigating measures or to notify regulatory bodies about the interference. Once an interfering radio transmitter has been identified, adjustments can be made in the network to mitigate the effects of this interference. This identification of interfering transmitters in a communication system, like the communication system 100 discussed above in connection to FIG. 1, can be implemented in a microwave radio link transceiver 110 and/or in a network node arranged to perform a network operations and maintenance, OAM, function in a network of the plurality of microwave radio link transceivers 110, 115, 160.

The network node then implements a tool for managing interference in a network comprising a plurality of microwave radio link transceivers.

By identifying and classifying an interferer by, e.g., frequency, power and/or bandwidth it will be possible to initiate actions to mitigate the interference. By separating failure modes caused by interference from other failure modes that cause bit errors or degraded capacity, it becomes possible for an operator to take appropriate action to resolve the problem. Without the knowledge of current interfering signals, an operator may be more likely to assume that a problem is due to malfunction of the interfered radio link. The interferer identification by power level, frequency band, and bandwidth, makes it possible to classify the interferer as being comprised in the operators own network or part of some external network. Also, if the interferer is within a licensed band but from an external source, a complaint report can be sent to frequency regulatory authorities.

One possible use-case for the receiver 300 in FIG. 3 is when a new radio link transmitter is installed within the same network and interferes with a receiver of another radio link. This can also be caused by a change in the environment, e.g. new building, billboard, or similar, or a change in configuration of an existing transmitter. In all these cases the receiver 300 is able to identify this in-band interferer and if the channel frequency and modulation bandwidth match with some known transmitter within the network, this can be tested by executing a handshake orchestrated by the central controller unit. The handshake can be done by changing power or frequency by a known pattern of the suspected interfering transmitter. If the interfering signal in the receiver follow the same pattern, then we know that transmitter is the source.

In-band interferers may also be part of some un-known network. This can for instance happen if another operator installs a new link, or makes a change to an existing transmitter configuration, or a change in environment occurs which causes a reflection of radio signal energy in some new direction. If the interferer characteristics like channel frequency and bandwidth is not matching any of the radio link transmitters in the area, it i most likely due to an external interferer. The identified characteristics of the interferer can then be sent to a network controller unit. The network controller provides the network operator with an incident report with information about the characteristics of the interferer such as the frequency, bandwidth and received signal strength of the interference signal.

The proposed receiver 300 can also detect very low, and non-severe, interference. There can be a situation where a receiver has a very weak in-band interferer that is not strong enough to, in normal operation conditions, make a noticeable impact on the radio link performance. With the methods of detecting interferers proposed herein, it will still be possible to detect and report the interferer to the network operator.

Interferers can be detected within the full receiver bandwidth and also at the band edges, which is an advantage. When an interferer and the interfered link has different bandwidths, the impact can be intermittent, e.g. degrade performance during rain, but have little or no impact during normal operating conditions.

Various interference mitigation techniques can be used in case interference is detected. For instance, in case the operator holds a block license, other channel assignments can be tested to see if the interference situation improved. Thus, the techniques proposed herein allow an operator to better optimize usage of licensed frequencies.

In the case where the interferer is identified as being part of the operator's network, it will normally be possible to reconfigure the involved radio links to resolve the interfering situation. This can, for instance, be achieved by any of decreasing the interferer output power, changing the radio channel used by the interfering and/or the interfered radio link, activating automatic transmit power control (ATPC) at the interferer, and/or increasing the output power at the far end of the interfered radio link.

In case the interfering equipment resides outside the operators own network, it is possible to perform actions such as: increasing output power in the interfered direction, changing channel at the interfered radio link, and/or notifying a regulatory body about the interference situation.

FIG. 6 illustrates an example process 600 for interference mitigation in a microwave radio link network, executed in some network node. A trace function obtains data related to detected interferences in the network, by some demodulator 310, and optionally also data related to current operating performance of the receivers in the network. This information may comprise, e.g., bit error rates, estimated SNR and/or SINR values, mean-squared detection errors (MSE), transmission capacity, residual Bit Error Rate (BER), modulation stability, and the like. The trace function also obtains information about radio link configurations in the network.

To identify and classify an external interferer several variables in the system can be used such as, e.g., a list of interferers(s) from the interference detector 314 (see FIG. 3), and/or information about radio link configuration for all nodes within the network, i.e., comprising any of frequency band, transmit power, channel spacing, geographical position, receiver performance metrics, received Signal Strength Indication (RSSI), Mean Squared Error (MSE).

If some radio link within the operators own network can be identified as the interfering transmitter, then a handshake procedure can be initiated to validate the identification of the interfering transmitter. If the validation is successful, a report to the network operator can be generated. If the interfering transmitter is not part of the operators own network, then a report can be generated which comprises the identified features of the interfering transmitter.

Thus, the trace function will check if the listed interfering signal is matching with any known radio link. Trace function can automatically, or with manual intervention, validate if suspected interferer is the correct one when part of own network. The trace function is part of the network management function.

To summarize, there is disclosed herein a network node 110, 170 arranged to identify one or more interfering microwave radio link transceivers 160 out of a plurality of microwave radio link transceivers 110, 115, 160. The network node 110, 170 is arranged to obtain data indicative of one or more identification features associated with at least one interference signal detected at an interfered microwave radio link transceiver 110, 300. The network node 110, 170 is also arranged to obtain transmission characteristics of the transceivers in the plurality of microwave radio link transceivers 110, 115, 160, and to identify the one or more interfering microwave radio link transceivers based on the one or more identification features and on the respective transmission characteristics. Thus, the network node implements a network management tool for interference mitigation in a microwave radio link network.

According to some aspects, the transmission characteristics comprise any of geographical transmitter location, geographical transmission direction, transmission output power, transmission bandwidth, and/or transmit antenna pattern.

These transmission characteristics can be matched to the identification features of the interference signals, so discover the source of a particular interference signal.

According to some other aspects, the network node is arranged to verify an identity of a microwave radio link transceiver associated with an interference signal by triggering a change in the transmission characteristics for one or more microwave radio link transceivers in the plurality of microwave radio link transceivers 110, 115, 160, and monitoring the report 400, 450 for a corresponding change in identification features. The change is optionally associated with a detectable pre-determined pattern. Thus, a potentially interfering transmitter is modulated, and the interference is monitored. If a corresponding change in the interference identification features can be seen, then the correct source of the interference has been discovered.

According to some further aspects, the network node is arranged to trigger transmission of an interference notification message to a network entity, where the interference notification message comprises information associated with an identified interfering microwave radio link transceiver. The network node 170 may optionally be arranged to trigger an interference mitigating change in the transmission characteristics at the identified interfering microwave radio link transceiver, wherein the change comprises any of: a decrease in output power, a decrease in transmission frequency bandwidth, a change in carrier frequency, and/or activation of an automatic transmit power control, ATPC, procedure. Thus, the interference conditions in the network can be improved by re-configuration of the interfering transmitter, which is likely to lead to improved radio link performance. Transmitter parameterization in the network can be optimized in this manner in order to improve overall network throughput and spectral efficiency.

According to additional aspects, the network node is arranged to trigger an interference mitigating change in operating characteristics at the interfered microwave radio link transceiver, wherein the change comprises any of an increase in far-end output power, a decrease in operating frequency bandwidth, a change in carrier frequency, a change in modulation and coding, and/or activation of an automatic transmit power control, ATPC, procedure. This way the interference situation at the receiver can be improved without re-configuration of the interfering transmitter. This option may be used with advantage in case no re-configuration of the interfering transmitter is possible.

FIG. 7 is a flow chart illustrating methods which summarize the above discussions. There is illustrated a computer implemented method, performed in a network node 110, 170 or in a demodulator 310, for detecting one or more interference signals comprised in a received radio signal Din, Sin, the method comprising receiving S1 a radio signal Din, Sin, detecting S2 an information signal Sdet, 201 comprised in the received radio signal, determining S3 a difference signal as a difference between the received radio signal Din, Sin, and the detected information signal Sdet, detecting S4 one or more interference signals 202, 203, 204 by identifying signal content comprised in the difference signal, the signal content being associated with a signal power 230 above a pre-determined threshold level 260, associating S5 at least one of the detected interference signals 202, 203, 204 with one or more respective identification features, and outputting S6 data 400, 450 indicative of the one or more identification features.

Generally, it is appreciated that the functions and features of the devices described herein can be formulated also as method steps. Thus, the various optional features of, e.g., the demodulator 310, also constitutes optional methods steps which may be comprised in the methods discussed in connection to FIG. 7.

FIG. 8 schematically illustrates, in terms of a number of functional modules, the components of a network node 800 according to an example of the present teachings. The network node is arranged to detect one or more interference signals comprised in a received radio signal Din, Sin. The network node 800 comprises:

a receive module S1x configured to receive a radio signal Din, Sin, a detection module S2x configured to detect an information signal Sdet, 201, comprised in the received radio signal, a determining module S3x configured to determine a difference signal as a difference between the received radio signal Din, Sin, and the detected information signal Sdet, a detection module S4x configured to detect one or more interference signals 202, 203, 204 by identifying signal content comprised in the difference signal, the signal content being associated with a signal power 230 above a pre-determined threshold level 260, an association module S5x, configured to associate at least one of the detected interference signals 202, 203, 204 with one or more respective identification features, and an output module S6x configured to output data 400, 450 indicative of the one or more identification features.

In general terms, each functional module S1x-S6x may be implemented in hardware or in software. Preferably, one or more or all functional modules may be implemented by a processing unit like that in FIG. 10 which will be discussed in more detail below.

FIG. 9 illustrates various realizations 900 of the methods, devices and techniques discussed above. The methods and receivers discussed above may be implemented in a baseband processing unit (BBU) which could be deployed in a centralized manner or in a virtual node in the communications network 100. The split between the physical node and the centralized node can be on different levels, e.g. at I/Q samples level from the radio unit. Parts of the proposed methods may of course also be implemented on a remote server comprised in a cloud-based computing platform.

With reference also to FIG. 1, FIG. 10 schematically illustrates, in terms of a number of functional units, the general components of a network node 1000 according to embodiments of the discussions herein. Processing circuitry 1010 is provided using any combination of one or more of a suitable central processing unit (CPU), multiprocessor, microcontroller, digital signal processor DSP, etc., capable of executing software instructions stored in a computer program product, e.g., in the form of a storage medium 1030. The processing circuitry 1010 may further be provided as at least one application specific integrated circuit ASIC, or field programmable gate array FPGA.

Particularly, the processing circuitry 1010 is configured to cause the device 1000 to perform a set of operations, or steps, such as the methods discussed in connection to FIG. 7 and the discussions above. For example, the storage medium 1030 may store the set of operations, and the processing circuitry 1010 may be configured to retrieve the set of operations from the storage medium 1030 to cause the device to perform the set of operations. The set of operations may be provided as a set of executable instructions. Thus, the processing circuitry 1010 is thereby arranged to execute methods as herein disclosed. In other words, there is shown a network node 1000, comprising processing circuitry 1010, a network interface 1020 coupled to the processing circuitry 1010 and a memory 1030 coupled to the processing circuitry 1010, wherein the memory comprises machine readable computer program instructions that, when executed by the processing circuitry, causes the network node to:

receive S1 a radio signal Din, Sin, detect S2 an information signal Sdet, 201 comprised in the received radio signal, determine S3 a difference signal as a difference between the received radio signal Din, Sin, and the detected information signal Sdet, detect S4 one or more interference signals 202, 203, 204 by identifying signal content comprised in the difference signal, the signal content being associated with a signal power 230 above a pre-determined threshold level 260, associate S5 at least one of the detected interference signals 202, 203, 204 with one or more respective identification features, and output S6 data 400, 450 indicative of the one or more identification features.

The storage medium 1030 may also comprise persistent storage, which, for example, can be any single one or combination of magnetic memory, optical memory, solid state memory or even remotely mounted memory.

The device 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the device 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 11 illustrates a computer readable medium 1110 carrying a computer program comprising program code means 1120 for performing the methods illustrated in, e.g., FIG. 7, when said program product is run on a computer. The computer readable medium and the code means may together form a computer program product 1100.

The invention claimed is:

1. A demodulator for a microwave radio link transceiver, comprising:

an input port arranged to receive a radio signal;

a slicer module arranged to detect an information signal comprised in the received radio signal; and an interference detection module arranged to determine a difference signal as a difference between the received radio signal, and the detected information signal, wherein the interference detection module is arranged to detect one or more interference signals by identifying signal content comprised in the difference signal, the signal content being associated with a signal power above a pre-determined threshold level, the interference detection module is further arranged to associate at least one of the detected interference signals with one or more respective identification features, and the demodulator comprises an output port arranged to output data indicative of the one or more identification features.

2. The demodulator of claim 1, wherein the received radio signal is associated with an intermediate frequency (IF) bandwidth in excess of a frequency band of the information signal.

3. The demodulator of claim 1, wherein the received radio signal comprises a digital signal, wherein the difference signal is determined as a difference in complex amplitude between the received radio signal and the information signal.

4. The demodulator of claim 1, wherein the one or more identification features comprises a power level of the detected one or more interference signals.

5. The demodulator of claim 1, wherein the one or more identification features comprises a frequency bandwidth of the detected one or more interference signals.

6. The demodulator of claim 1, wherein the one or more identification features comprises a carrier frequency of the detected one or more interference signals.

7. The demodulator of claim 1, wherein the one or more identification features comprises a polarization distribution of the detected one or more interference signals.

8. The demodulator of claim 1, wherein the one or more identification features is indicative of a temporal behaviour of the detected one or more interference signals.

9. The demodulator of claim 1, wherein the data indicative of the one or more identification features comprises a list of a pre-determined number of detected interference signals.

10. The demodulator of claim 9, wherein the one or more detected interference signals are arranged according to a severity criterion.

11. A computer implemented method, performed in a network node or in a demodulator, for detecting one or more interference signals comprised in a received radio signal, the method comprising:

receiving a radio signal;

detecting an information signal comprised in the received radio signal;

determining a difference signal as a difference between the received radio signal, and the detected information signal;

detecting one or more interference signals by identifying signal content comprised in the difference signal, the signal content being associated with a signal power above a pre-determined threshold level;

associating at least one of the detected interference signals with one or more respective identification features; and outputting data indicative of the one or more identification features.

* * * * *